May 19, 1964  G. GUANELLA  3,133,991
METHOD AND APPARATUS FOR MASKING COMMUNICATION SIGNALS
Filed Aug. 21, 1959  6 Sheets-Sheet 1 a)

b)

c)

d)

Inventor
Gustav Guanella

By Pierce, Scheffler & Parker
Attorneys

Inventor
Gustav Guanella
By Pierce, Scheffler & Parker
Attorneys

May 19, 1964  G. GUANELLA  3,133,991
METHOD AND APPARATUS FOR MASKING COMMUNICATION SIGNALS
Filed Aug. 21, 1959  6 Sheets-Sheet 4

Inventor.
Gustav Guanella

By Peirce Scheffler & Parker
Attorneys

United States Patent Office 3,133,991
Patented May 19, 1964

3,133,991
METHOD AND APPARATUS FOR MASKING COMMUNICATION SIGNALS
Gustav Guanella, Zurich, Switzerland, assignor to Patelhold Patentverwertungs- & Elektro-Holding A.-G., Glarus, Switzerland
Filed Aug. 21, 1959, Ser. No. 835,282
Claims priority, application Switzerland Aug. 23, 1958
6 Claims. (Cl. 179—1.5)

This invention relates generally to a method and apparatus for secrecy masking communication signals, and more particularly to a communication signal concealment system wherein an intelligence signal is modulated by an auxiliary signal and the resultant signal is uniformly distributed over the output signal range to prevent signal decoding.

In general, two fundamentally different methods are used for masking or concealing communication signals. According to the first method the signal to be transmitted is divided at the sending end into time-sequential or frequency-related components which are then transmitted to the receiving end in a sequence differing from the original arrangement, whereupon the parts are arranged and reassembled. This first method gives only limited assurance against unauthorized detection, particularly when speech signals are being transmitted, since the amplitude fluctuations which are characteristic of such signals remain intact. According to the second signalling method there is added at the sending end to the signal to be transmitted a supplementary signal, which is supposed to conceal the waveform of the communication signal and therefore make it unintelligible. The supplementary signal is subsequently subtracted at the receiving end. Either the supplementary signal is obtained both at the sending end and at the receiving end from synchronously running separate signal sources, or the supplementary signal generated at the sending end is, possibly after masking, transmitted to the receiver over a separate channel. It is also possible to generate at the sending end a relatively-simple auxiliary-signal and transmit it to the receiver, at which the more complicated supplementary-signal is produced with identical means at the sending and receiving ends. Also the masking method of the second method does not give complete assurance against unauthorized decoding, since by the employment of time consuming statistical methods, it may be possible to reconstruct the communication signal.

The present invention relates to the second signalling method and seeks to increase the assurance against unauthorized decoding. In particular the signal transmitted to the receiver has been disguised to be inaccessible even to an investigation with the help of statistical methods.

According to the method of the invention there is generated at the sending end a sequence of pulses, one of whose parameters (for example, the pulse height, the pulse length, the temporal position of a pulse edge or the frequency of a pulse-loaded carrier-wave) is modulated by a combined signal consisting of the communication signal and the supplementary signal by means of a switching arrangement whose curve exhibits a sawtooth form. With regard for example to the case of height-modulated pulses, the height "$z$" of the generated impulse is equal to the magnitude "$y$" of the total signal (except for a proportionality factor) only when the latter lies in the range of $0 < y < K$. If $y$ goes above the constant value K, so that $(n \cdot K) < y < (n+1) \cdot K$ there occur pulses of height $z$ which are a function of $y - n \cdot K$. The sequence of these pulses is transmitted to the receiver, in which for reconstruction of the total signal there is likewise employed a switching arrangement with a sawtooth curve. The recovery of the communication signal itself occurs with known modulation means.

Other objects of the invention will become more apparent from a study of the following specification when considered in conjunction with the accompanying drawings in which:

FIGS. 1a–1d constitute voltage-time curves illustrating the modulation of the communication signal by the auxiliary signal according to the present invention;

Figure 1:
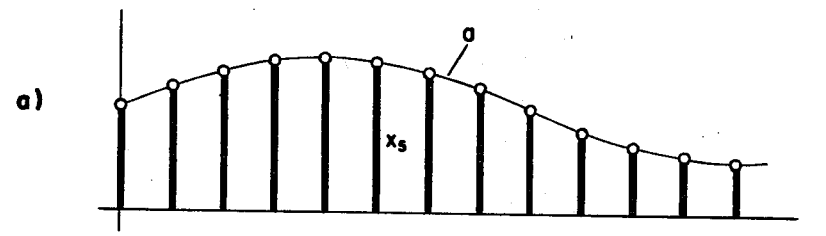
Figure 1:
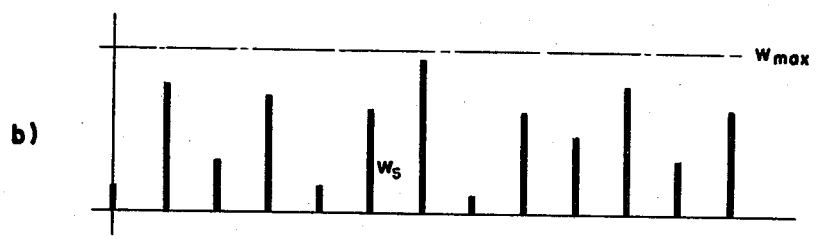
Figure 1:
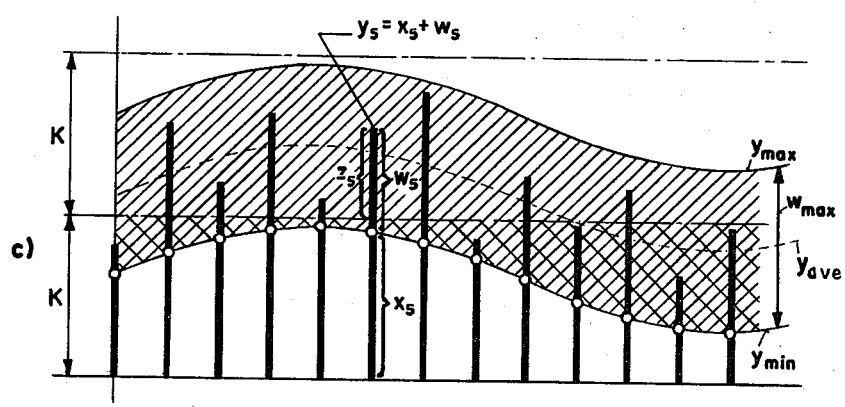
Figure 1:
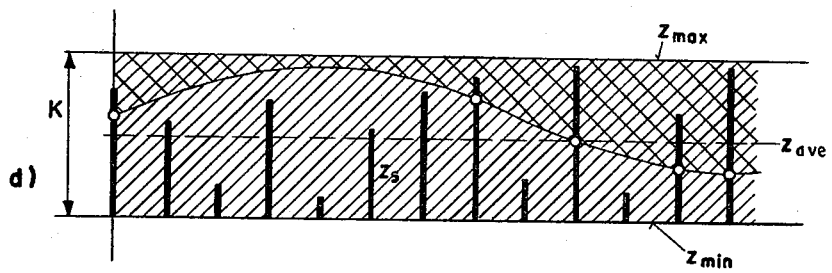

FIGURE 1a shows a sequence of pulses whose heights $x$ follow the temporal course of the sinusoidal communication signal "$a$." In FIG. 1b there is represented the auxiliary signal which likewise consists of a sequence of pulses. The individual auxiliary pulses coincide temporally with the pulses of the line "$a$" and have heights "$w$" which vary from pulse to pulse according to any function which is as irregular as possible. FIG. 1c shows (in thick lines) the total signal, which consists of pulses whose heights "$y$" equal $x+w$. The total modulated signal is thus composed of the communication signal FIG. 1a and the auxiliary signal FIG. 1b.

While the heights $w$ of the pulses formed by the auxiliary signal (FIG. 1b) are distributed as uniformly as possible over the whole range (from zero to $w_{max}$), this is not generally true of the heights $x$ of pulses (FIG. 1a) formed by the communication signal. When a speech signal is under consideration, for example, the heights of the pulses $x$ generally group themselves about an average value because of speech pauses and syllable intervals, as well as because of certain sounds being spoken more softly than others. Very great and very small heights $x$, therefore, occur rather infrequently. Consequently the heights $y$ of the pulses of the total signal (FIG. 1c) likewise lie generally about an average value K; very great heights (approaching 2 K) and very small heights (approaching 0), therefore, occur rather infrequently. On the basis of these characteristics of the total signal, there can easily be demonstrated, among other things, speech pauses; a speech pause is present whenever no pulses whatever occur outside of the range between $x_{average}$ and $(x_{average}+w_{max})$. Even relatively slow variations of the speech signal, that is, vibrations of relative low frequency, remain intelligible despite the masking.

According to the present invention an equalization of the pulse heights is achieved by converting the greatest pulse heights to smaller ones, so that the pulses are caused to lie in a range which has previously been occupied only slightly. Accordingly a pulse whose height $y$ (equal to $x+w$) goes above the constant value K (FIG. 1c) is reduced by subtraction to the height $z$ equal $y-K$. On the other hand, pulses whose height $y$ do not reach the value $K$ are left uninfluenced; for such pulses, therefore, $z$ equals $y$. FIG. 1d shows the sequence of the pulses after this transformation; this sequence is transmitted to the receiver.

Figure 2A:
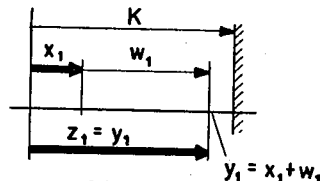
FIGS. 2a and 2b illustrate the magnitude of the resultant modulated pulses relative to a constant value K.
Figure 2B:
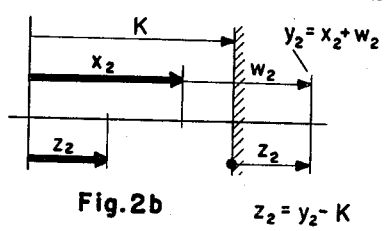

FIG. 2 illustrates the aforementioned transformation still more clearly. From each speech pulse with the height $x$ and the simultaneously-occurring auxiliary pulse with the height $w$ there is formed the total pulse $y$. When $y$ goes above the constant value $K$ (FIG. 2b), the outgoing pulse exhibits the height $x_2$ equals $y_2 - K$; if, on the contrary, $y$ is smaller than $K$ (FIG. 2a), then $z_1$ equals $y_1$.

Figure 3A:
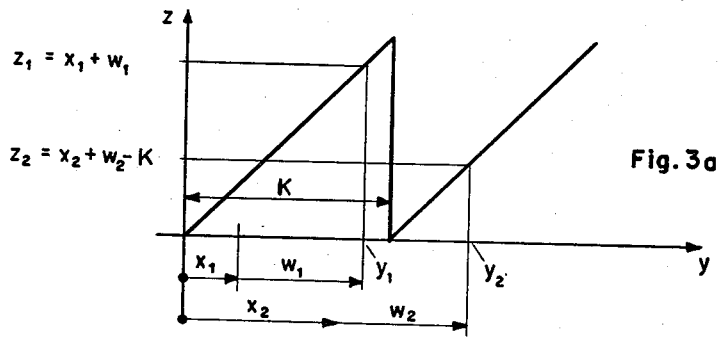
FIGS. 3a and 3b illustrate, respectively, the modulation and demodulation signals which are obtained with the use of a sawtooth level control signal.
Figure 3B:
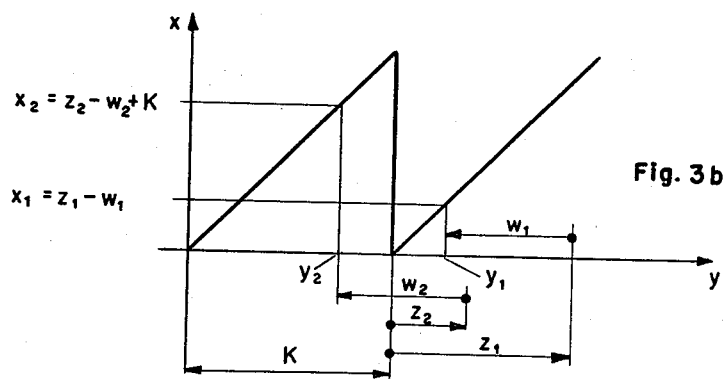
Figure 5A:
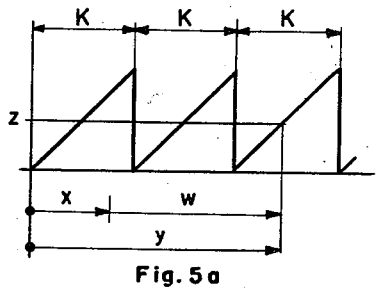
FIGS. 5a and 5b illustrate the principles of FIGS. 3a and 3b when the modulating signal extends over a number of control sawtooth pulses.
Figure 5B:
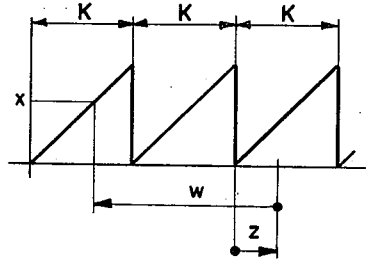

The transformation described above can be obtained by utilizing a switching arrangement having a curve which exhibits the sawtooth form according to FIG. 3a. This curve illustrates the output pulses $z_1$ and $z_2$ for values of $y$ below and above the signal level $K$. There may also be employed a curve according to FIG. 5a which includes a plurality of periods of extent $K$. Accordingly, generally expressed, the height of an outgoing pulse is $z = y - n \cdot k$ when the height of the corresponding incoming pulse lies between $n \cdot K$ and $(n+1)K$. The integer $n$ denotes the number of periods of height $K$ which have been passed by the height $y$. Corresponding demodulation of the transmitted signal into its components is accomplished in the same manner at the receiving side of the apparatus as shown in FIGS. 3b and 5b, respectively.

Figure 4A:
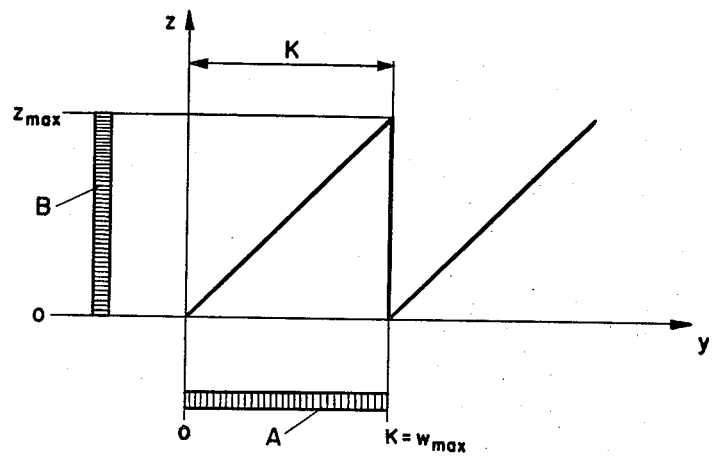
FIG. 4a illustrates the uniform distribution of the output signals in the absence of intelligence signals and FIG. 4b illustrates the uniform distribution of the output signals in the presence of intelligence signals.
Figure 4B:
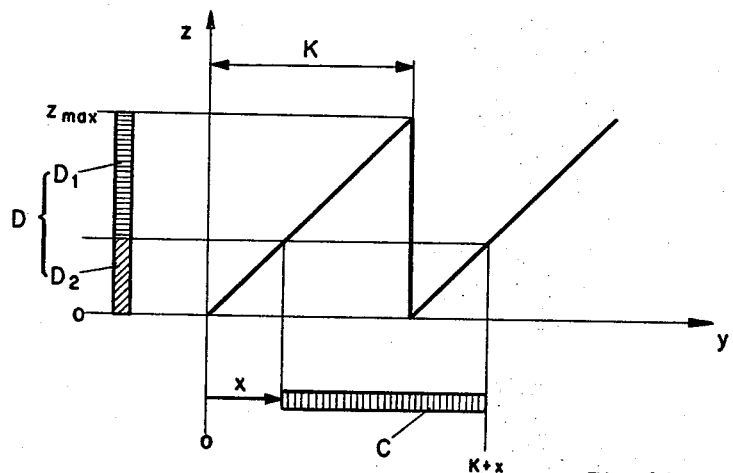

Preferably $K$ is selected a little greater (in any event no smaller) than $x_{max}$, and $w_{max}$ should agree as nearly as possible with $(N-1) \cdot K$ when $N$ denotes the number of neighboring periods of the sawtooth curve. In this way there is obtained as well as possible the desired distribution of the pulse heights over the whole employed range in the pulse sequence transmitted to the receiver. This follows from the following arrangement wherein, according to FIGS. 4a and 4b, $K$ equals $x_{max}$ and $w_{max}$ equals $K$. Since the heights $w$ of the pulses formed by the auxiliary signal are by definition distributed uniformly over the whole possible range (zero to $K$) (field A in FIG. 4a), the probability is that a pulse height lies in the range between $w$ and $(w$ plus$\Delta w)$, independently of $w$ equals$\Delta w/K$. In the absence of the pulse $x$ there exists a linear connection between $z$ and $w$ (first period $K$ of the sawtooth curve); accordingly the heights $z$ are also desirably distributed over the whole possible range between zero and $z_{max}$ (field B in FIG. 4a). When now to the supplementary signal there are added pulses $x$, the heights $y$ of the pulses of the total signal are distributed in the range between $x$ and $(K$ plus $x)$ (field C in FIG. 4b). But this distribution is in its turn transformed by the sawtooth curve into a desired distribution of the heights $z$ in the range between zero and $z_{max}$ (field D in FIG. 4b); from FIG. 4b it clearly follows that the part $D_1$ corresponds to that part of the field C which lies between $x$ and $K$, the part $D_2$ to that part of the field C which lies between $K$ and $(K$ plus $x)$. Consequently at observation of the outgoing signal (sequence of pulses with the heights $z$) it can no longer be determined whether a communication signal is present at all, and, if it is, what magnitude it exhibits. Consequently, at fulfilment of the stated conditions, the masking is complete.

The condition of uniform distribution of the pulse heights $w$ of the auxiliary signal probably cannot be completely fulfilled in practice. In many cases, for example, pulses whose height lies close to $K$ will occur with smaller probability than pulses with smaller heights; close to $K$, therefore, the probability will fall more or less steeply from the sought constant value to zero. In such cases optimal conditions are obtained when this descent lies symmetrically to the value $K$.

An absence of the speech signal may in certain cases enable, by comparison of the pulse sequence transmitted to the receiver with the auxiliary signal likewise transmitted via a special channel to the receiver, a determination of the waveform of this auxiliary signal. For diminishing this determination and to prevent unauthorized decoding of communication signals, there may be superposed on the communication signal "$a$" a continuous cover signal, which is obtained, for example, from a noise signal. If this cover signal is present in a frequency range lying outside the useful frequency band it can easily be eliminated at the receiving end by filtration. It goes without saying that the method of the invention can, for further increasing the assurance of secrecy, be combined with other methods known in themselves for varying communication signals.

Switching arrangement suitable for carrying out the described masking method are well known in themselves. It will, therefore, be sufficient to describe by block diagrams various arrangements for the sending and the receiving ends.

Figure 6:
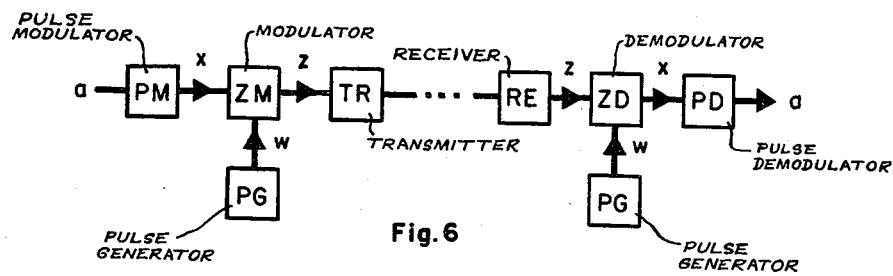
FIGS. 6–9 are block diagrams of various sending and receiving arrangements utilizing the instant invention.

FIG. 6 shows in simplified form the essential parts of a communication-transmitting installation which operates according to the method of the invention. The pulse modulator PM generates according to the communication signal "$a$" to be transmitted a sequence of, for example, height-modulated impulses $x$. A pulse generator PG delivers the auxiliary signal which consists of pulses $w$ which always occurs simultaneously with the pulses $x$. In the modulator ZM there is generated from ($x$ plus $w$) the outgoing signal $z$, which is transmitted by the transmitter TR to the receiver RE. From the signal $z$ recovered by the receiver and the supplementary $w$ there is reconstructed by the demodulator ZD a pulse sequence $x$ modulated with the supplementary signal $a$; from this the communication signal is generated by the pulse demodulator PD. Measures which serve for the generation at the receiving end of an auxiliary signal which corresponds to the auxiliary signal employed at the sending end are not a subject of the invention; as mentioned in the introduction, such measures are known. Consequently it is here assumed that the waveform of the signal $w$ generated at the receiving end by PG is identical with the waveform of the signal $w$ generated at the sending end.

Figure 7:
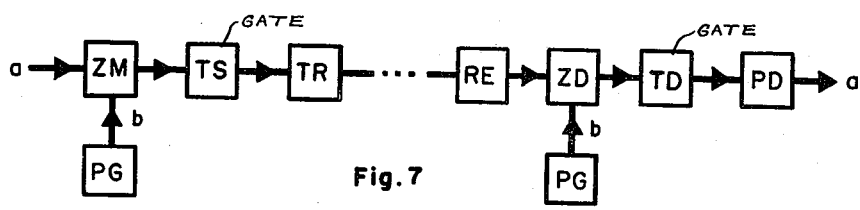

Another variant is shown in FIG. 7. Here not only the communication signal "$a$" but also the supplementary signal "$b$" coming from the source PG exhibits at first a steady course; in a known manner the signal might be a noise voltage.

In the modulator ZM there is formed the total signal $y$ equals $a$ plus $b$, and from it there is obtained the signal $z = y - nK$. From this signal the gate circuit TS generates the pulse sequence to be transmitted to the receiver. At the receiving end the difference signal formed in the modulator ZD from the received signal running in the form of pulses and the steadily-running auxiliary-signal $b$ is transformed by the gate circuit TD into a pulse sequence which is modulated in accordance with the communication signal $a$; the latter itself is reconstructed by the pulse demodulator PD. The model according to FIG. 7 is particularly suited for subsequent addition of a masking arrangement to an existing communication-transmitting installation operating with pulse modulation. The signal $z$ can be introduced into the installation at the sending end, since it already contains the parts TS and TR in one form or another.

Figure 8:
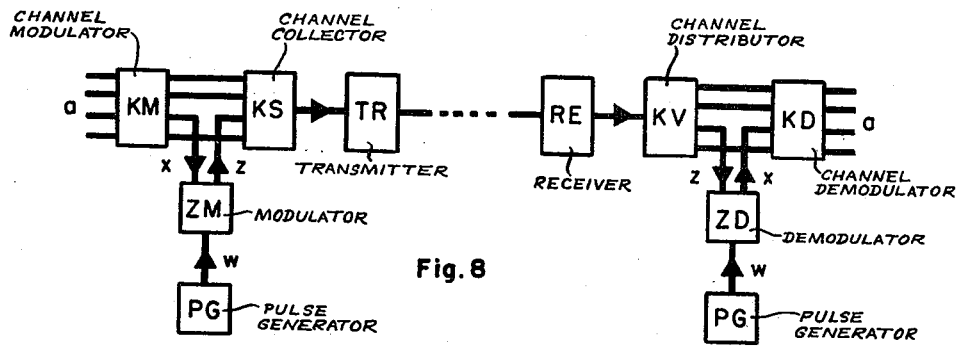

The method of the invention can also be employed for masking at least one of the channels with installation for multichannel transmission according to the time-multiplex system, as shown by way of example in FIG. 8. On the sending side, in the channel modulator KM, there are formed, for example, four time-modulated pulse-sequences each with a communication signal "$a$." The pulses $x$ of the 3rd channel are conducted for signal concealment over the modulator ZM. Then the outgoing pulses $z$ are together with the pulses of the rest of the communication canals conducted to the channel collector KS, at whose exit, therefore, there occurs a sequence of pulses, which are assigned in temporal succession to the various communication channels. These pulses are transmitted by the transmitter TR to the receiver RE. In the channel distributor KV the received pulses are again distributed over the corresponding channel conductors. From the pulses $z$ of the 3rd channel there is then again obtained with ZD the unmasked pulse sequence $z$. Finally, in the channel demodulator KD the original communication signal "$a$" corresponding to the channel pulse sequence is recovered.

Figure 9:
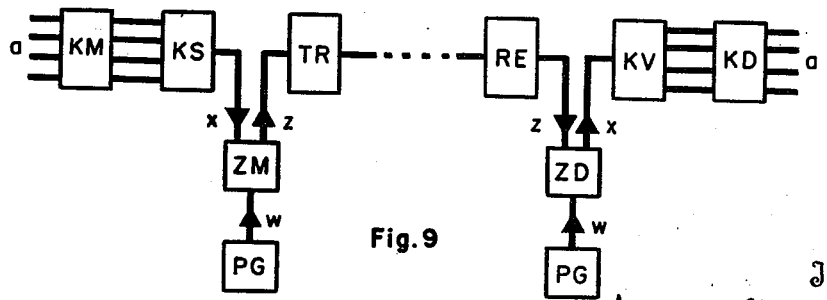

Also, as shown in FIG. 9, all of the channels of a time-multiplex transmission-installation can be masked in common, in that the pulse sequence occurring at the exit of the channel collector KS is conducted over the modulator ZM, so that there occurs a sequence of masked pulses $z$ which correspond in temporal succession to the various communication signals $a$. In this case the received pulse sequence is first conducted over ZD, so that at first there again occurs the unmasked signal $x$, from which the pulses belonging to the individual channels are then selected by the channel distributor of demodulator KD, or demodulated to the communication signal $a$.

Figure 10:
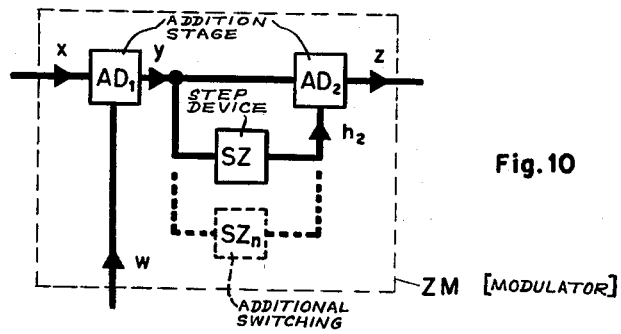
FIG. 10 is a block diagram of a modulator structure and FIG. 11 illustrates a stepped characteristic of the level control signal.
Figure 11:
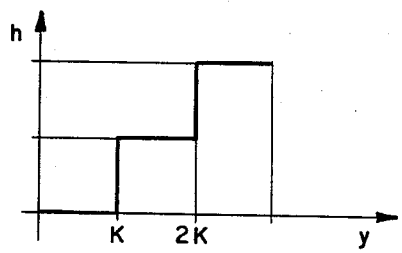

FIG. 10 shows by way of example the construction of the modulator ZM. First, in the addition stage $AD_1$ the total voltage $y$ equals ($x$ plus $w$) is formed from $x$ and $w$. Another addition stage $AD_2$ forms the difference voltage from $y$ and a stepped-variable control voltage $h_2$. This conrtol voltage is generated in dependence on $y$ by a step device SZ, whose characteristic is shown in FIG. 11. Accordingly the resultant outgoing voltage $z$ is, according to the characteristic shown in FIG. $3a$ or FIG. 5, dependent on the incoming voltages $x$ and $w$. The step device SZ may consist, for example, of an amplifier with limiter, in such a way that the outgoing voltage upon going above a particular limit value of the incoming voltage is increased by steps by the value K. For obtaining a characteristic with a plurality of periods, there may be included additional switching arrangements $SZ_n$ of this kind with correspondingly-different operating voltages, as shown in dotted lines in FIG. 10.

Figure 12:
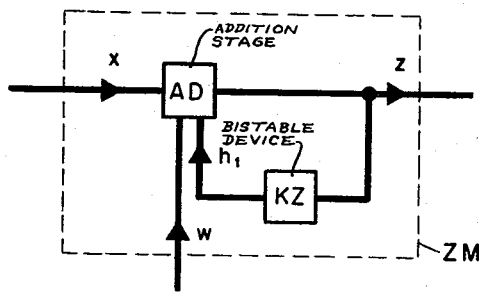
FIGS. 12–14 illustrate by block diagrams further modulator embodiments.

Instead of the arrangement represented in FIG. 10 the modulator ZM may also exhibit according to FIG. 12 a single addition stage AD, to which there is conducted simultaneously $x$ and $w$ as well as a feed-back stepped variable signal $h_1$. This latter signal is produced in a bistable device KZ, which is controlled by the outgoing signal $z$. Device KZ trips from a first position to a second position differing therefrom by K as soon as the arriving magnitude $z$ goes above the limit value K. It retains this second position and trips back to the first position as soon as $z$ goes below the value zero. Consequently the control signals $h_1$ belonging to the two positions vary between the value $-K$ and the value 0, so that the resultant outgoing magnitude $z$ of the modulator corresponds to the characteristic shown in FIG. 3.

Figure 13:
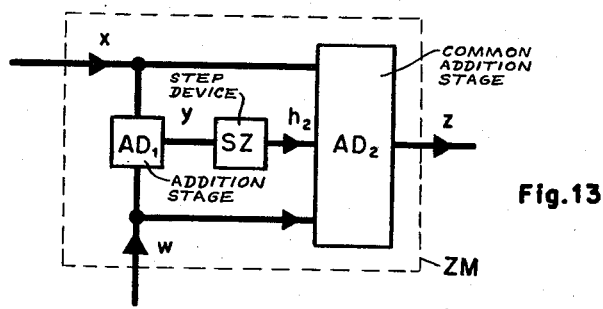

With the arrangement shown in FIG. 13 there is likewise provided with a common addition stage $AD_2$ for forming the total signal $z$ from the signals $x$, $w$ and the variable step signal $-h_2$. The signal $h_2$ is taken from a step device SZ, which corresponds to the example illustrated in FIG. 10. For control of this step device there serves the total voltage $y$ formed from $x$ and $y$ taken from the addition stage $AD_1$.

Figure 14:
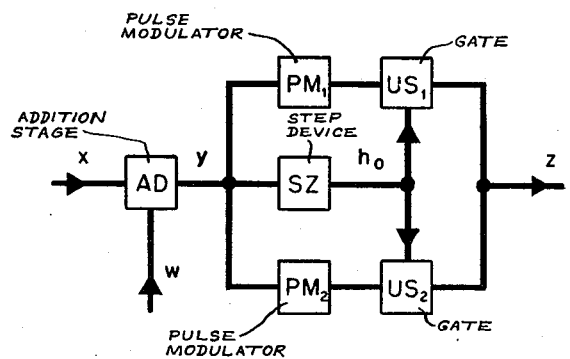

With the arrangement shown as a further example in FIG. 14 there are provided two pulse modulators $PM_1$ and $PM_2$, whose outgoing pulses are modulated according to the total voltage $y$ obtained in AD in such a way that the modulated parameters, for example, the heights, always differ from each other by the constant value $k$. The gate circuits $US_1$ and $US_2$ are controlled by an auxiliary signal $h_0$ in such a way that only the outgoing pulses of one of the pulse modulators are always conducted further. The auxiliary signal $h_0$ generated by the step device SZ varies according to the course of $y$ between two constant values. Accordingly the parameter of the outgoing pulses $z$ is dependent on $x$ and $w$ according to the characteristic shown in FIG. $3a$.

Figure 15:
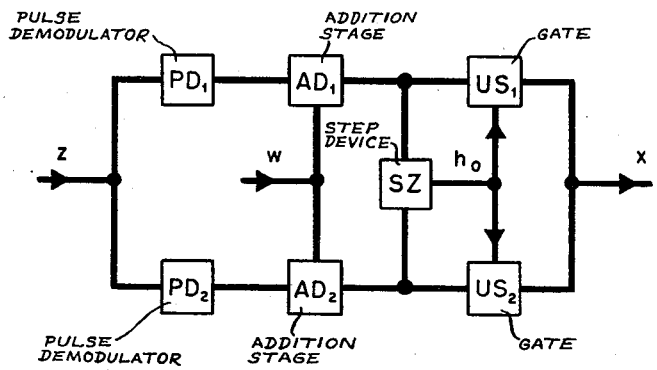
FIG. 15 illustrates by a block diagram one demodulator embodiment designed for use with the modulator of FIG. 14.

For demodulation on the receiving side there may also, according to FIG. 15, be provided two separate pulse demodulators $PD_1$ and $PD_2$, whose outgoing pulses always differ from each other by the constant amount K. In $AD_1$ and $AD_2$ there are formed from these signals and the auxiliary signal $w$ two differential signals, only one of which is always further conducted over the gate circuit $US_1$ and $US_2$. These gate circuits are controlled by an auxiliary signal $h_0$ which is obtained from the mentioned difference signals with the help of step device SZ. Accordingly the outgoing signals $x$ formed in this way are dependent on $z$ and $w$ according to the characteristic shown in FIG. $3b$.

If with the repeatedly-mentioned sawtooth-curves the descent is not ideally vertical, certain disturbance signals may occur on the receiving side. These can be suppressed by quantizing the total signal on the sending end before it is conducted to the switching arrangement with the sawtooth curve. The fineness of the quantizing must, with taking into account of the steepness of the mentioned descent, be selected in such a way that, for example, for every pulse $y$ (FIG. $1c$ and FIG. 2) it can be clearly decided whether its height is greater or smaller than K. With some forms of communication signals, when, for example, the latter can assume values differing only relatively little from each other (for example, telegraph signals), it is sufficient to employ a relatively coarse quantizing of the supplementary signal.

While in accordance with the patent statutes I have illustrated and described the best forms and embodiments of my invention now known to me, it will be apparent to those skilled in the art that other changes may be made in the method and apparatus described without deviating form the invention as set forth in the following claims:

I claim:

1. The method of secrecy signalling between a transmission station and a receiving station which comprises the steps of adding an arbitrarily varying signal to an intelligence signal at the transmission station to obtain a combined signal, transforming all combined signals with a value greater than a given constant corresponding to or exceeding the maximum value of the intelligence signal by subtracting from the value of the combined signals a value equal to said given constant or an integral multiple thereof to obtain a transmission signal with values lying between zero and said given constant, transmitting said transmission signal to the receiving station, subtracting the same arbitrarily varying signal from the transmission signal, and transforming the resulting signal by adding a value equal to said given constant or an integral multiple thereof to thereby reconstitute the intelligence signal.

2. Apparatus for secrecy signalling between a transmission station and a receiving station comprising means at said transmission station for generating a first sequence of pulses modulated by the intelligence signal to be transmitted, means generating a second sequence of auxiliary pulses modulated by an arbitrarily varying signal, first means adding the pulses of said first sequence to the pulses of said second sequence to obtain a sequence of combined pulses, means transforming all of said combined pulses with a value greater than a given constant corresponding to or exceeding the maximum value of the pulses modulated by the intelligence signal by subtracting from the value of said combined pulses a value equal to said given constant or an integral multiple thereof to obtain a sequence of transmission pulses with values lying between zero and said given constant, means transmitting said sequence of transmission pulses to said receiving station, means at said receiving station subtracting the same sequence of auxiliary pulses from the received transmission pulses to produce a sequence of resultant pulses, means transforming said sequence of resultant pulses by adding thereto a value equal to said given constant or an integral multiple thereof to obtain a sequence of pulses lying between zero and said given constant, and means demodulating last said pulses to thereby reconstitute the intelligence signal.

3. Apparatus for secrecy signalling between a transmission station and a receiving station as defined in claim 2 wherein said means at said transmission station for transforming said combined signals comprises a second adding means having its input connected to the output of said first adding means for said first and second pulse sequences, the input of said second adding means being also connected to the output of at least one limiter device provided with a level-setting means preceded by amplifier means, the input to said amplifier means being connected to the output of said first adding means for said first and second pulse sequences.

4. Apparatus for secrecy signalling between a transmission station and a receiving station as defined in claim 2 wherein said means at said transmission station for transforming said combined signals comprises a bistable device having its input connected to the output of said first adding means for said first and second pulse sequences, the output of said bistable device being connected to the input of said first adding means for said first and second pulse sequences.

5. Apparatus for secrecy signalling between a transmission station and a receiving station as defined in claim 2 wherein said means at said transmission station for transforming said combined signals comprises a second adding means having its input connected to the respective outputs of said first and second pulse sequence generating means, the input to said second adding means being also connected to the output of at least one limiter device provided with a level-setting means preceded by amplifier means, the input to said amplifier means being connected to the output of said first adding means for said first and second pulse sequences.

6. Apparatus for secrecy signalling between a transmission station and a receiving station as defined in claim 2 wherein said means at said transmission station for transforming said combined signals comprises first and second pulse modulators having their inputs connected respectively to the output of said first adding means for said first and second pulse sequences, the output pulses of said first and second pulse modulators having values different from each other by an amount corresponding to said given constant, first and second gate means having control means therefor responsive to different levels, the inputs to said first and second gate means being connected respectively to the outputs of said first and second pulse modulators, a limiter device provided with a level setting means preceded by amplifier means, the input to said amplifier means being connected to the output of said first adding means for said first and second pulse sequences and the output from said limiter device being connected to said control means for said first and second gate means; and wherein at said receiving station there is provided first and second pulse demodulators having their inputs connected respectively to receive the pulses from said transmission station, the output pulses of said first and second pulse demodulators having values different from each other by said given constant, said subtracting means being comprised of first and second subtracting units having their inputs connected respectively to the outputs from said first and second pulse demodulators and also connected to a source of the same arbitrarily varying signal utilized at said transmission station, said transforming means at said receiving station being comprised of third and fourth gate means having control means therefor responsive to different levels, the inputs to said third and fourth gate means being connected respectively to the outputs of said first and second subtracting units, a second limiter device provided with a level setting means preceded by amplifier means, the input to said amplifier means being connected to the outputs of said first and second subtracting units and the output from said second limiter device being connected to said control means for said third and fourth gate means, and said demodulating means at said receiving station are connected to the outputs from said third and fourth gate means.

References Cited in the file of this patent

UNITED STATES PATENTS

| | | |
|---|---|---|
| 2,266,194 | Guanella | Dec. 16, 1941 |
| 2,836,657 | Bartelink | May 27, 1958 |